June 6, 1944.                    H. ANGEL                    2,350,382
                METHOD OF AND MEANS FOR STORING TELEGRAPH SIGNALS
                              Filed Jan. 11, 1941
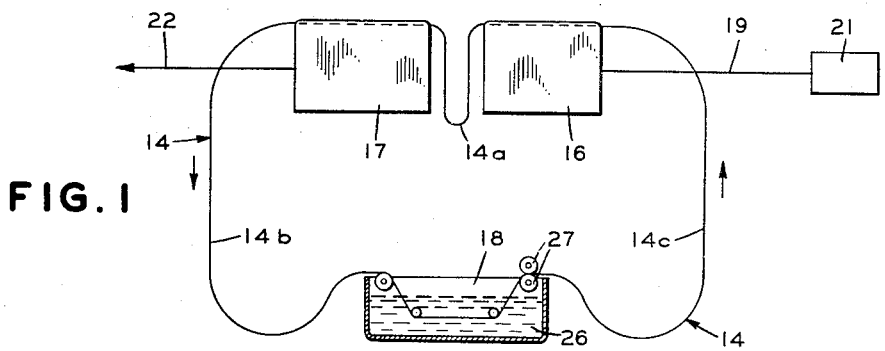
FIG. 1
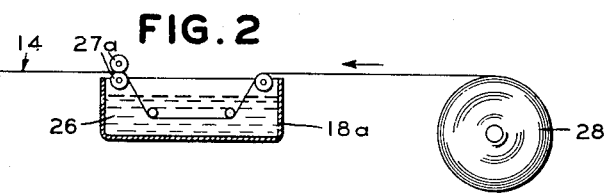
FIG. 2
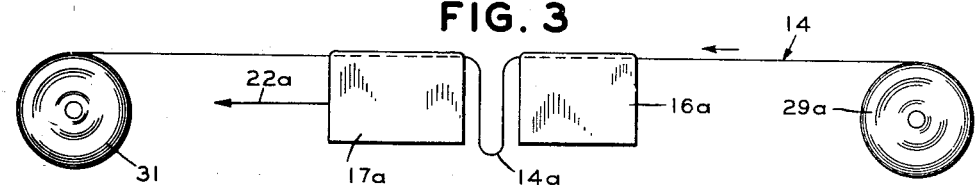
FIG. 3
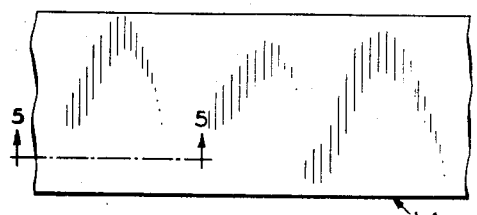
FIG. 4
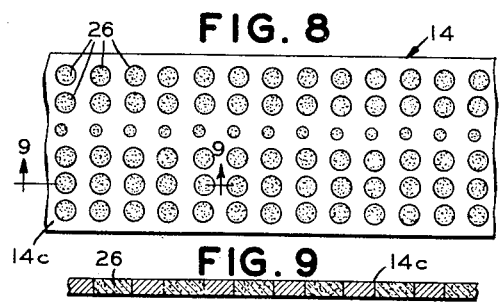
FIG. 8
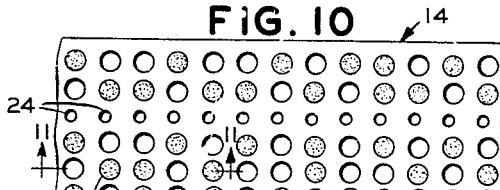
FIG. 9 / FIG. 10
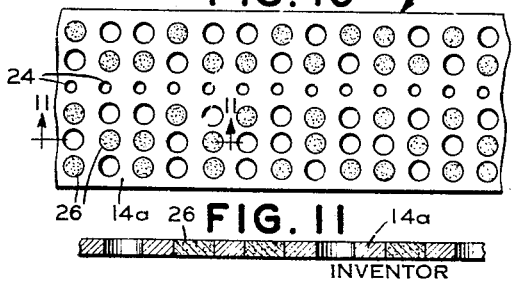
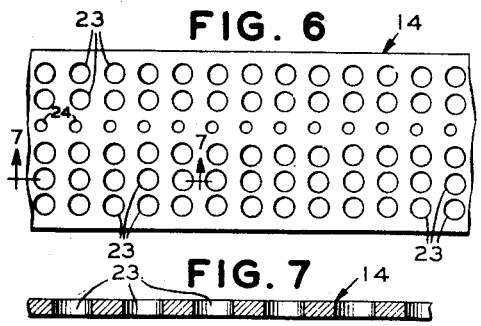
FIG. 6
FIG. 5 / FIG. 7
INVENTOR
H. ANGEL
BY *M. R. Marsh*
ATTORNEY Patented June 6, 1944

2,350,382

UNITED STATES PATENT OFFICE 2,350,382

METHOD OF AND MEANS FOR STORING TELEGRAPH SIGNALS

Herbert Angel, Brooklyn, N. Y., assignor to The Western Union Telegraph Company, New York, N. Y., a corporation of New York Application January 11, 1941, Serial No. 374,051

8 Claims. (Cl. 178—17)

This invention relates primarily to a method of and means for storing telegraph signals, and is particularly adapted to a method of and means for storing telegraph signals of the permutation or other type for variable lengths of time, prior to the retransmission thereof over an outgoing circuit.

In present day telegraph systems there is a large demand for an economical and flexible arrangement for storing the telegraph signals. Newly devised telegraph switching systems, such as the one disclosed in a patent to E. R. Wheeler et al., No. 2,193,810, issued March 19, 1940, have been developed and commercially used which require that received signals be stored for various lengths of time and in some instances more than once before the retransmission thereof over an outgoing circuit. Where the telegraph signals pass through one or more such switching systems prior to reaching their destination, temporary storage thereof may occur several times.

There are two general types of signal storage arrangements available at present, they being known as the metallic storage system and the tape storage system. In the metallic storage system the received signals function to selectively set groups of small metallic elements in permutations representative of the received signals. The small metallic elements thereafter control a transmitting arrangement to transmit representative signals to the sending circuit. An example of such a metallic storage unit is disclosed in a patent to E. R. Wheeler et al., No. 1,576,167, issued March 9, 1926, wherein small pins in a drum are permutably set in one or the other of two positions to represent the received or stored signals and thereafter employed to control a transmitting mechanism.

In the tape storage systems a relatively thin and narrow tape is employed as the storage medium and has perforations formed in transverse sections thereof to represent, according to a predetermined plan, the received signals or the signals to be stored. The transmission of the stored signals is effected by feeding the perforated tape through a tape transmitter which transmits to a sending circuit signals representative of the perforations in the tape. The perforated tapes may also be prepared directly at a keyboard perforator which perforates the tape in accordance with the actuated key levers. Such keyboard controlled and signals controlled perforators are well-known in the art and the latter may be of the type disclosed in a patent to R. Hoover et al., No. 1,851,838, issued March 29, 1932.

While the mechanical storage arrangements have the advantage that the mechanical elements may be used over and over again, they have the disadvantage of having a limited storage capacity, in that they can store only a fixed number of signals. Another disadvantage in mechanical storage arrangement is that they require comparatively expensive and complicated equipment with attendant high first, operating and maintenance costs.

While the perforators or reperforators, as they are sometimes called, for preparing the perforated tape and the tape transmitter for transmitting signals representative of the perforations in the tape may be comparatively simple and easy to manufacture and maintain, the tape storage system has the disadvantage in that the storage tape can be used but once. Accordingly, the expense of the tape becomes a considerable item, especially in storage systems where double storage is employed.

In view of the above, it is one of the primary objects of the present invention to provide a method of and means for storing telegraph signals which has all the advantages of both the tape and metallic storage arrangements with none of the disadvantages thereof.

It is another object of the invention to provide a method of and means for storing telegraph signals wherein the storage medium may be used over and over again.

A more specific object of the invention resides in the method of and means for perforating a tape in accordance with received signals to store the signals, feeding the tape through a transmitting arrangement, and finally refilling the perforations in the tape so that it may be reperforated in accordance with other received signals.

These and further objects of the invention will be apparent hereinafter when taken in conjunction with the accompanying drawing and the specification.

In accordance with the invention, a tape which may be similar to the paper tapes employed at present in tape storage systems is used and, in one method of practising the invention, the tape is originally perforated at all the perforating positions therein, that is, each code position of the tape has a perforation therein. The thus completely perforated tape next encounters a hole refilling unit where all the holes, which may include the feed holes, are filled by some method such as passing the tape through a liquid bath of some plastic-like or wax-like substance or material which is effective to fill or seal the original perforations in the tape. The hole refilling unit in the preferred embodiment of the invention comprises a wax bath for the tape, the wax being maintained in a molten state in the bath and of such a character that it solidifies or hardens at ordinary room temperatures, and is effective to fill or seal all of the original perforations. Obviously, other arrangements may be used to fill up or seal the original perforations in the tape, such as spraying the perforated tape with a reasonably quick drying paint, lacquer or similar substance. The sealed or filled tape next passes through a perforator or reperforator where all or some of the wax-like substance in some of the holes is punched out or otherwise removed in accordance with the signals to be stored. The tape in leaving the perforations is allowed to form a storage loop and then passes through a transmitting device where signals representative of the perforations from which the wax-like substance has been removed is transmitted to a sending circuit. The tape in leaving the transemitting device again passes through the hole refilling unit where the empty perforations are refilled or resealed.

Thus, it is obvious that the tape may be used over and over again, and such an arrangement effects a considerable saving in material. In the preferred embodiment of the invention the storage tape is in the form of a continuous loop or band which successively encounters the various described mechanisms. In the modified form of the invention, rolls of tape are completely perforated and all the perforations filled with the wax-like substance. The thus prepared tape is supplied to a code perforator where the wax-like substance is selectively removed from certain of the original perforated holes, in much the same manner as the tape is perforated in present day types of tape storage systems. In the second embodiment of the invention the rolls of tape after being used, or after they have passed through the transmitters, are again passed through the hole refilling unit to refill the empty holes and are, therefore, capable of being used over and over again.

A more thorough and complete understanding of the invention may be had by reference to the accompanying drawing, in which:

Fig. 1 is a schematic arrangement of the various units through which the storage tape passes in accordance with the principles of the invention;

Figs. 2 and 3 show the arrangements of the tape refilling, the wax-like substance removing and the transmitting mechanisms in relation to the storage tape as employed in the modified embodiment of the invention;

Fig. 4 is a plan view of a section of the storage tape before the original perforations are formed therein;

Fig. 5 is an enlarged sectional view taken on line 5—5 of Fig. 4;

Fig. 6 is a plan view of a section of the storage tape with so-called original perforations formed therein;

Fig. 7 is an enlarged sectional view taken on line 7—7 of Fig. 6;

Fig. 8 is a plan view of a section of the tape after it has passed through the hole refilling unit or bath to have all of the original perforations filled with the wax-like substance;

Fig. 9 is an enlarged sectional view taken on line 9—9 of Fig. 8;

Fig. 10 is a plan view of a section of the storage tape after having passed through the perforator or reperforating mechanism wherein the wax has been removed from certain of the original perforations; and Fig. 11 is an enlarged sectional view taken on line 11—11 of Fig. 10.

Referring first to Fig. 1, there is shown diagrammatically the preferred embodiment of the invention wherein a storage member of tape indicated generally by reference numeral 14 and specific sections thereof by reference numerals 14a, 14b, etc. in the form of a continuous band arranged to successively pass through a perforating mechanism 16, a transmitting mechanism 17 and a perforated hole refilling mechanism or unit 18. A circuit 19 is shown connecting the perforating mechanism 16 with a transmitting station 21. The transmitting station 21 may be a considerable distance removed from the perforating mechanism 16 such as in a distant city, or may be at a transmitting point nearby. As shown in Fig. 1, the perforating mechanism is arranged for control by signals received over the circuit 19. However, the perforating mechanism may be of the type which operates in response to the actuation of key levers to perforate a recording or storage tape. The tape 14 in leaving the perforating mechanism 16 passes through the transmitting mechanism 17 and provision is made between the perforating and transmitting mechanisms for the formation of a storage loop 14a in the tape. The loop 14a in the tape constitutes the means for storing the signals after they are perforated in the tape prior to their transmission by the transmitter 17. The transmitter 17 has connected thereto an outgoing circuit 22 over which signals are transmitted in accordance with the perforations in the tape. The storage tape 14 in leaving the transmitting mechanism 17 or the section 14b next encounters the unit 18 where the perforations therein are refilled with the wax-like or plastic material or substance. The storage tape in leaving the unit 18 or the section 14c thereof again passes to the perforating mechanism 16 where it is again perforated in accordance with the operation of the perforator.

The first step in preparing the storage tape 14 in one method, which step may be omitted as hereinafter pointed out, is to take a piece of tape such as that shown in Figs. 4 and 5 of considerable length and pass the same through a perforating mechanism where a given number of holes is perforated in each transverse section thereof. Where the system is used to store signals of the five unit permutation type, each transverse section of the tape will have five large perforations such as 23, Figs. 6 and 7, formed therein and one smaller feed hole perforation 24. The storage tape now the form as shown in Fig. 6 is passed through the three units, the perforating mechanism 16, the transmitting mechanism 17, and the hole filling unit 18 of Fig. 1 and formed into a continuous band. The storage tape 14 in passing through the unit 18 has all the perforated holes therein filled with a wax-like substance 26 and appears similar to that shown in Fig. 8, wherein all the perforations are filled or sealed by the substance 26. The wax-like substance 26 is preferably one that is solid at room temperatures and somewhat flexible so as to flex with the tape. However, a hard wax may be employed and the flexing of the tape occur between transverse rows of holes. The storage tape 14 in leaving the unit 18 preferably passes between a set of rollers 21, one or both of which may be frictionally driven from a suitable source of power when it is desired not to depend entirely or in part on the tape advancing mechanism of the tape perforator to advance the tape through the unit 18, where excess of the wax which might adhere to the surface of the tape is removed. The storage tape 14 in leaving the unit 18 or the section 14c in Fig. 1 of the form shown in Fig. 8 passes to the perforator mechanism 16 where the wax-like substance in various of the original perforations therein is removed in accordance with the operation of the perforating mechanism. The storage tape in leaving the perforating mechanism may appear similar to the section shown in Fig. 10 where the wax or like substance has been removed from certain of the original code perforations and feed hole perforations in accordance with the operation of the perforating mechanism 16. Besides filling the holes, the wax or like substance in the unit 18 may form a film of greater or less thickness on one or both surfaces of the tape which may serve to strengthen the tape and prevent premature wear thereof. Accordingly, the tape which may be any suitable material such as paper, metal, etc. will last indefinitely.

The storage tape 14, after having been perforated or with the wax or wax substance 26 removed or partly removed from certain of the holes therein in accordance with the operation of the perforating mechanism 16 and in the form such as shown in Fig. 10, next encounters the transmitting mechanism 17. If, for some reason, the circuit such as 22 from the transmitting mechanism is not available during the operation of the perforating mechanism 16, the transmitting mechanism will not immediately advance the tape, and a loop of storage tape such as 14a will form between the two units 16 and 17. The size of the loop 14a that may form between the perforating and transmitting mechanisms determines the number of signals that may be stored which in turn, with other things being equal, depends upon the length of the storage tape band 14. As the transverse rows of perforations in the tape 14 are formed about one-tenth of an inch apart, it is obvious that a considerable number of signals can be stored in a relatively short storage loop 14a. However, the link of the band 14 may be of such a length that the maximum storage capacity thereof will not be reached in normal operation.

In the transmitting mechanism 17 the transverse rows of holes in the tape are sensed one row at a time, and signals are transmitted to the sending circuit 22 in accordance with the original perforations in the tape that have the wax removed therefrom in substantially the same manner as the perforations in a perforated tape are sensed in an ordinary perforated tape. With a hole filling or sealing material 26 of the proper character, a mechanical transmitting mechanism may be employed. such as that disclosed in a patent to Angel et al., No. 2,172,269, issued September 5, 1939, wherein the set of sensing fingers is brought into contact with the tape to sense a perforation or the absence thereof in the tape. Depending upon the absence or presence of a perforation in the tape, the sensing fingers control the transmission of either one or the other of two line conditions to a sending circuit. The application of the invention, however, is not limited to the use of a mechanical transmitting mechanism, as with the employment of an opaque or slightly opaque wax or wax-like substance, a photoelectric transmitting mechanism may be employed. In such an arrangement the removal of the wax or a part of the wax from one of the original perforated holes permits the passage of a light beam through the tape, while a hole completely filled or sealed with wax prevents the passage of the light beam through the original perforation. The light beam in passing through the holes in the tape controls a light-sensitive device to transmit signals in accordace with the perforations from which all or a part of the wax has been removed.

The tape, after passing through the transmitting mechanism, encounters the unit 18 where all holes therein are refilled with the wax, and the tape is again in condition to have the perforating mechanism 16 remove the wax from any of the holes therein in accordance with received signals. Thus, it is evident that the recording tape 14 may be used over and over again for the storage of signals, and as there is no waste of the tape a more economical storage system results. Another saving may be made by re-using the hole filling substance. The perforating unit 16, Fig. 1, in addition to removing the wax from predetermined of the code holes in accordance to the operation thereof, preferably removes the wax from each of the smaller feed holes such as 24, Figs. 6 and 10. The feed holes are employed to keep the code perforations in registry with the sensing means at the transmitter 17 and the length of the band is such that it is some multiple of the distance between two consecutive feed holes. In this manner perforating occurs at the same sections of the tape or at the original holes as the tape feeds through the units over and over again.

It is obvious that the first step or the step in preparing the tape 14 wherein all the holes in each transverse section of the tape are perforated may be omitted and the blank tape, such as that of the section shown in Fig. 4, looped through the three units 16, 17 and 18. In this arrangement, the perforating mechanism 16 perforates original holes in the tape in accordance with the operation thereof, whereupon the transmitting mechanism transmits corresponding signals, and the tape then passes to the unit 18 where these code perforations are filled with the wax 26. The tape 14 in leaving the unit 18 for the first time will obviously have only the holes therein corresponding to the original code perforations filled with wax. However, as the tape 14 continues to pass through the various units several times, each transverse row in the tape will ultimately have the maximum number of perforations therein which will be filled with the wax as the tape passes through the unit 18.

When the band of tape 14 is prepared with all the holes punched in each transverse section thereof, as in Fig. 6, prior to the passing through the three units 16, 17 and 18 of Fig. 1, it will be apparent that the perforating mechanism 16 need not remove all the plastic from a particular hole, as it is only necessary to remove an amount sufficient to properly control the transmitting mechanism 17.

In the modification of the invention, the storage tape 14 instead of being formed in a loop is supplied to the various units from supply rolls. As shown in Fig. 2, a supply roll of tape 28, which has preformed therein perforations corresponding to the perforations in Fig. 6, is arranged to pass through a hole-filling unit or bath 18a to a take-up roll 29. The take-up roll 29 may be power driven from a suitable source to advance the tape 14 through the unit 18a where it passes through a bath of the wax 26, with rollers such as 27a arranged to remove any excess of the wax from the surface of the tape. Rolls of prepared tape such as 29 are then associated with the perforating mechanism where the wax is removed from the holes in accordance with the operation of the perforating mechanism. The tape 14 in passing from the perforating mechanism encounters a transmitting mechanism where signals corresponding to the holes from which wax was removed are transmitted. On leaving the transmitting mechanism the used tape is wound up on a roll, and at some subsequent time again passed through the hole-filling unit 18a. In Fig. 3, the roll 29a indicates the supply for the perforating unit 16a which is operated in accordance with the signals to be stored, and the loop 14a represents the storage section of the tape with the roll 31, the take-up roll of used tape. The transmitter 17a, Fig. 3, transmits over the circuit 22a signals corresponding to the perforations made in the tape by the perforating mechanism 16a.

The arrangement shown in Figs. 2 and 3 has certain advantages over the arrangement of Fig. 1, especially where the amount of storage is likely to exceed a given amount. In such a system the number of signals that can be stored between the perforating and transmitting mechanisms is practically unlimited, and the system has a further advantage in that each perforating mechanism need not be associated with a particular transmitting mechanism, as the tape in coming from a perforating mechanism may be transferred and arranged to pass through and control any one of a number of transmitting mechanisms such as 17a. A further advantage of the system disclosed in Figs. 2 and 3 is that each storage unit need not have an associated hole refilling unit 18a, as the perforated tapes from a number of transmitting mechanisms may be run through a single hole refilling unit such as 18a.

It is obvious, of course, that various other modifications of the invention may be made without departing from the spirit or essential attributes thereof, and it is desired, therefore, that only such limitations be placed thereon as are imposed by the prior art or are specifically set forth in the appended claims.

What is claimed is:

1. The method of operating a telegraph system which comprises the steps of perforating a storage tape with a predetermined number of original perforations in each transverse section thereof, filling said perforations with a wax or like substance, removing an appreciable portion of the wax or like substance from certain of the original perforations in each transverse section of said tape to represent, according to a predetermined plan, signals to be stored, employing the tape with the wax or like substance removed to control the transmission of representative signals, and thereafter refilling the holes in said tape from which said wax or like substance was removed to enable the re-use thereof as a storage medium.

2. A method of operating a telegraph system which comprises the steps of perforating a storage tape with a predetermined number of original perforations in each transverse section thereof, filling said original perforations with a substance, removing a part or substantially all of the substance from certain of the successive transverse rows of perforations in said tape to represent, according to a predetermined plan, successively stored signals, providing for the formation of a storage loop of the thus-prepared tape, advancing said thus-prepared tape from said storage loop through a transmitting device, whereupon signals representative of the stored signals are transmitted, and thereafter refilling said perforations of said tape with said substance and re-using the same over and over again for storage purposes.

3. A method of operating a telegraph system which comprises the steps of perforating a storage tape with a predetermined number of original perforations in each transverse section thereof, advancing said tape through a bath of molten wax or like substance to fill or seal each of said original perforations with the wax or like substance, advancing the tape through the perforating mechanism to remove the wax or like substance from the perforated holes in accordance with signals to be stored, providing for the formation of a storage loop of the thus-prepared tape, advancing said thus-prepared tape from said storage loop through a transmitting device to transmit signals representative of the stored signals, and thereafter returning said tape to said bath of molten wax or like substance to refill the perforations therein.

4. Means for storing telegraph signals comprising a continuous band or tape, and means for perforating successive sections of said tape in accordance with signals to be stored, means including said perforated tape for controlling the transmission of signals representative of the perforations therein, means for forming a storage loop in said tape between said perforating and transmitting means, and means operative on said tape following the transmission of signals representing the perforations therein to refill said perforations, whereby said tape is re-usable over and over.

5. Means for storing telegraph signals comprising a storage medium in the form of a band or tape of substantial length, a perforating mechanism, means including said perforating mechanism and operative on successive sections of said medium to selectively remove parts thereof in accordance with signals to be stored, signal transmitting means controlled by sections of said medium from which parts have been removed to transmit representative signals, and means operative on said medium following the transmission of said representative signals to replace removed parts thereof and render the medium available for further signal storage.

6. Means for storing telegraph signals comprising a composite storage medium in the form of a continuous band of substantial length with removable particles predeterminedly arranged therein, a perforating mechanism, means including said perforating mechanism for selectively removing said particles from successive sections of said loop to represent, according to a predetermined plan, successively stored telegraph signals, means for forming a storage loop in said band, a transmitting means operative to take said storage medium from said storage loop and transmit successive telegraph signals in accordance with the presence or absence of said particles in successive sections thereof, and means operative on said band following the control of said transmitting means thereby for replacing the removed particles therein.

7. In a telegraph signal storage system comprising a continuous band of tape adapted to successively encounter a perforating mechanism, a transmitting mechanism and a tape renewing mechanism, means including said perforating mechanism for perforating said tape in accordance with telegraph signals to store the signals therein, means for forming a storage loop in said band between said perforating and transmitting mechanisms, means including said transmitting mechanism for transmitting signals representative of the perforations therein, and means in said tape renewing mechanism and employing only a single substance for renewing said tape by refilling said perforations therein with said substance to enable its re-use by said perforating mechanism.

8. The combination as claimed in claim 7, wherein the tape renewing mechanism comprises means for refilling the perforations in said tape with a removable wax or like substance.

HERBERT ANGEL.